Patented June 20, 1950

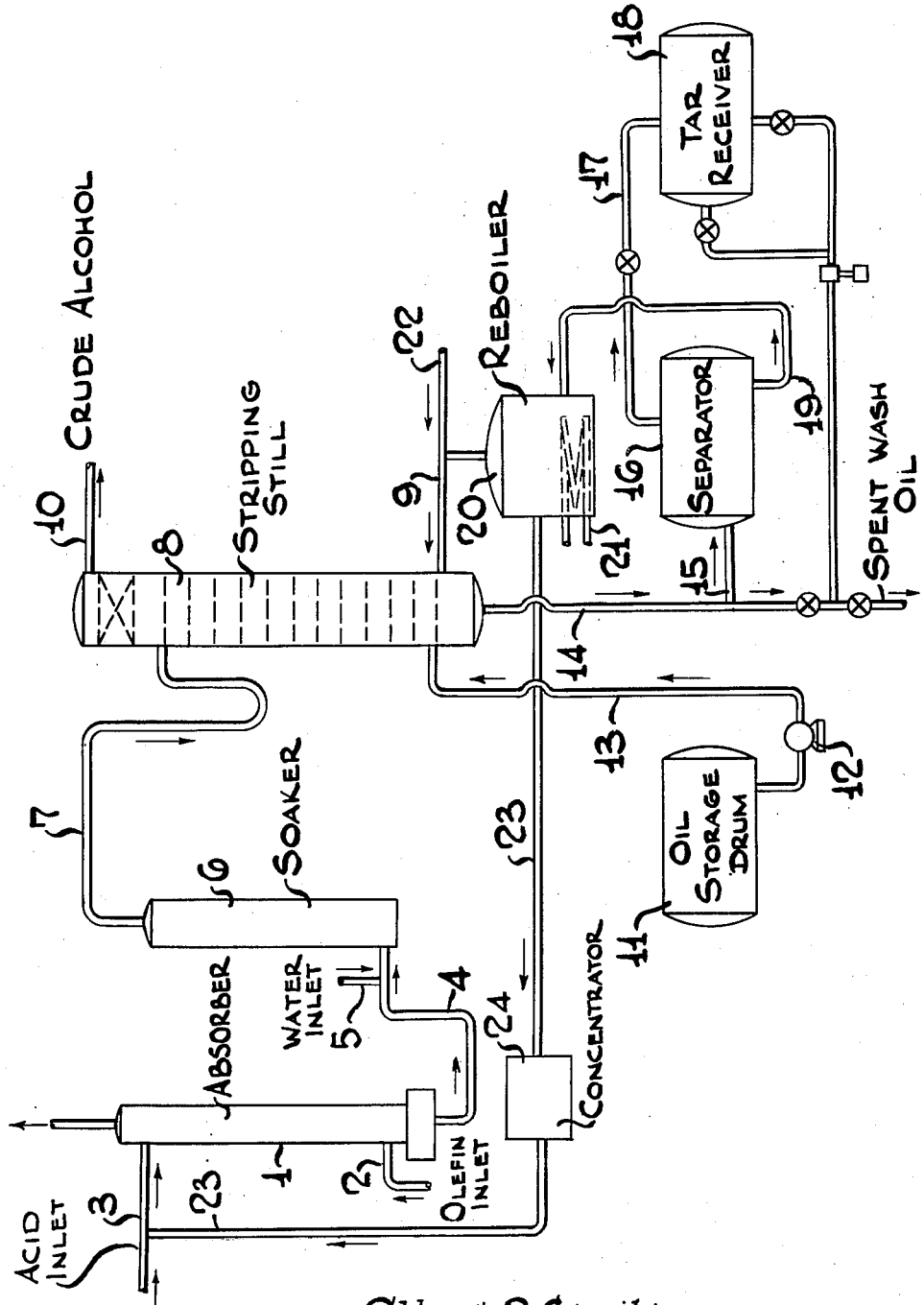

2,512,327

UNITED STATES PATENT OFFICE 2,512,327

SULFURIC ACID RECOVERY

Truman P. Hawes, Baton Rouge, La., and Albert P. Giraitis, Bradford, Pa., assignors to Standard Oil Development Company, a corporation of Delaware Application April 26, 1945, Serial No. 590,384

4 Claims. (Cl. 260—639)

This invention relates to a process for the removal of suspended carbon from aqueous sulfuric acid solution and relates more particularly to the separation of suspended carbon and other carbonaceous materials from the spent acid obtained in the preparation of alcohol by the sulfation of olefins. This invention relates to the same subject matter as application Serial No. 590,386, filed April 26, 1945, claiming a process for the recovery of sulfuric acid from sulfuric acid extracts obtained incident to the production of secondary alcohols from normal olefins.

In the manufacture of alcohols from unsaturated hydrocarbons by the use of strong sulfuric acid, a small portion of the unsaturated hydrocarbons is converted to materials which form tars and free carbon when subjected to the high temperatures needed to separate the crude alcohol from the acid. The tar must be removed to make the acid reconcentration equipment operable. If the removal is not complete before the acid is re-concentrated to high strength, the heat then applied causes the acid-soluble material to be decomposed to elemental carbon, which may appear in the concentrated acid as a filterable free carbon or as colloidal carbon. When unsaturated hydrocarbons are esterified with restored sulfuric acid, any carbon colloid present is gradually precipitated. On dilution of the ester acid extract, the carbon colloid is completely precipitated. A diluted acid extract will contain sufficient quantities of free carbon and resinous materials to lower the efficiency of operation of any subsequent piece of equipment for alcohol or acid recovery. The greatest reduction in efficiency to be expected would be in the acid restoration equipment, through fouling by free carbon. In the past, the separation of tar and carbon has been done by settling in large tanks, and at times by centrifuging. Removal of the less highly polymerized carbonaceous materials by pressure distillation has been attempted. It has also been the practice to bleach the restored acid to remove substantially all elemental and organic carbon prior to use for olefin absorption.

The disadvantages inherent in each of these methods of carbon reduction can be listed as follows:

(1) Bleaching requires the use of alloys resistant to nitric and strong sulfuric acid at high temperatures. The excess nitric acid remaining after bleaching must be removed by the use of ammonia which reacts with the sulfuric acid to form undesirable salts such as ammonium sulfate. In periods of national emergency the difficulty in obtaining and the cost of nitric acid are additional factors to be considered.

(2) Pressure distillation of the weak spent acid on a continuous commercial scale presents operation conditions requiring pumps and lines chemically resistant to hot weak sulfuric acid and having high mechanical strength at elevated temperature and pressure. The difficulty in overcoming these conditions to the extent necessary for commercial application constitutes a strong objection to its use. Furthermore, suspended carbon is not satisfactorily removed by this process.

(3) Mechanical filtration of the suspended carbon in the weak acid requires special equipment and because of the critical nature of the operation places a heavy demand on operating personnel. For use in a continuous process the operation of two filters set up in parallel is essential so that no interruption of the process would result when washing becomes necessary. Furthermore, corrosion of equipment makes repairs and upkeep costly.

It is, therefore, the main object of this invention to provide a more efficient process for the removal of suspended elemental carbon particles and small quantities of tars and resins from spent sulfuric acid.

It is another object of this invention to prevent the buildup of free carbon in reconcentrated sulfuric acid to be recycled in a process for the manufacture of alcohols by the sulfation of olefins.

Further objects of this invention will be apparent from the following specification when considered together with the accompanying drawing which is a schematic view in elevation of the application of the invention to the removal of free carbon and tars from spent sulfuric acid used in the manufacture of ethyl alcohol.

These and other objects of this invention are accomplished by removing suspended elemental carbon from aqueous sulfuric acid solutions by intimately contacting the acid with a hydrocarbon oil, non-reactive to the aqueous acid, separating the oil layer and withdrawing the acid free of suspended elemental carbon. While the process is applicable to the removal of suspended carbon from any type of dilute sulfuric acid it is particularly applicable to the dilute acid (usually about 45 per cent) recovered from the manufacture of ethyl alcohol. In this process an olefinic gas containing about 35% ethylene is treated with about 95% to 100% sulfuric acid which absorbs the ethylene to form sulfuric acid esters. These esters are hydrolyzed with water and steam distilled to recover the ethyl alcohol. The acid is recovered as still bottoms which contain elemental carbon, tars and soluble organic material. According to the invention the recovered weak acid is mixed with a hydrocarbon oil and settled to remove the suspended carbon and thus prevent buildup of carbonaceous material in the circulating acid.

The oil used consists of any hydrocarbon oil stable toward the sulfuric acid at temperatures near the boiling point of the acid at operating pressure. In most cases it is preferable to wash the acid as it flows from the still, and under such conditions, petroleum distillates exhibiting high flash point and high boiling range, such as lubricating oils, white oil and the like are most effective.

The amount of hydrocarbon used is determined by the condition of the acid but in general it is found that an amount of oil equivalent to 1 to 25 volume per cent of the weak acid washed is generally sufficient, the settling time decreasing with increased amounts of oil. For example when using 1 gallon of a 26° API gravity oil per 100 gallons of acid, 90% of the acid can be settled free of suspended carbon in 15 minutes, 95% in one hour and 98% to 99% in 24 hours.

In general the process is carried out in the following manner. The oil is preferably mixed with the acid from the stripping still in an orifice mixer or other suitable intimate mixing equipment and then flowed to a separator where the oil and carbon separate from the acid. The acid is taken off the bottom of the separator clear, ready for storage, or concentration. The oil-carbon layer can be disposed of as desired, as by burning.

Referring now to the drawing, an olefin gas containing about 35–40% ethylene in an inert diluent is introduced into tower 1 through line 2 and passed countercurrent to sulfuric acid of 97–8% concentration introduced through line 3. In tower 1 the ethylene is absorbed in the sulfuric acid forming ethyl sulfates. The extract thus obtained is removed from the bottom of tower 1 through line 4 where it meets a stream of water introduced through line 5. Sufficient water is added at this point to reduce the acid concentration to 45% calculated on an alcohol and hydrocarbon-free basis. The thus diluted extract is introduced into soaker 6 where it remains for a sufficient length of time for hydrolysis to occur, the monoethyl sulfates and the diethyl sulfates breaking down into alcohol. The extract is removed from soaker 6 by line 7 and introduced near the top of column 8 at a temperature of about 100° C. This column may be either a packed column or a plate column. The acid extract flows down through the column countercurrent to a stripping medium introduced at the bottom of tower 8 through line 9. In this manner ethyl alcohol is stripped from the weak acid extract and removed from the top of column 8 through line 10. During this stripping operation free carbon and tar accumulate in the weak sulfuric acid collected near the bottom of tower 8. As pointed out above, if this material is not removed, difficulties will be encountered when reconcentrating the acid. Therefore, according to the present invention, a hydrocarbon oil such as a gas oil having a flash point of 420° F. and a boiling range of 550°–900° F. is introduced from drum 11 by pump 12 and line 13 onto the bottom plate of tower 8 where it contacts the spent sulfuric acid. The mixture of acid and oil is passed through lines 14 and 15 into separator 16 where it is permitted to settle for a period of time sufficient to form two layers, an upper consisting of oil and all suspended carbon and a lower consisting of acid free from carbon. At the end of the settling time the oil containing the suspended carbon and small quantities of tar and resin is removed through line 17 and stored in tank 18. Recovered sulfuric acid free from suspended carbon is removed from separator 16 through line 19 and introduced into reboiler 20 which is heated by indirect heat exchange with diphenyl vapor in coil 21. By virtue of this operation the acid is partially concentrated and a portion of the polymers in the sulfuric acid are removed along with steam through line 9 and introduced into the bottom of tower 8 as a stripping medium therein. Additional steam may be added to the stripper if desired through line 22. Reconcentrated sulfuric acid of about 70% strength is withdrawn from reboiler 20 through line 23 and passed to the concentrator 24 where it is concentrated to a strength of 97% and then recycled to absorber 1.

From the above description it is clear that a process has been found whereby the detrimental effects on acid flow through restoring or stripping equipment due to the presence of suspended elemental carbon and tars and resins present in spent sulfuric acid, from the preparation of alcohols, has been overcome by mixing hydrocarbon oil with the spent acid and subsequently settling to recover sulfuric acid substantially free from suspended carbonaceous material.

The nature and objects of the present invention having thus been set forth and specific examples of the same given, what is given as new and useful and desired to be secured by Letters Patent is:

1. In a process for preparing ethyl alcohol comprising the steps of absorbing ethylene in 95 to 100% sulfuric acid to form an acid extract, diluting the acid extract with water to an acid concentration of about 45%, distilling the thus diluted extract, recovering ethyl alcohol overhead and spent acid containing free carbon as a bottoms product, the improvement which comprises adding substantially pure hydrocarbon oil to the spent acid causing the carbon to separate by flotation, settling the thus treated acid to obtain an oil layer containing the carbon particles and an acid layer substantially free of carbonaceous matter and reconcentrating and recycling the said treated acid to the absorption step of the process.

2. The process according to claim 1 in which the hydrocarbon oil is added in an amount equal to about 1 to 25 volume percent of the said spent acid.

3. The process of claim 1 in which the hydrocarbon oil is one having a boiling point range of about 550 to 900° F. and is stable to sulfuric acid at temperatures near the boiling point of the acid.

4. The process defined by claim 1 in which the hydrocarbon oil is kerosene.

TRUMAN P. HAWES.
ALBERT P. GIRAITIS.

REFERENCES CITED

The following references are of record in the file of this patent:

UNITED STATES PATENTS

| Number | Name | Date |
|---|---|---|
| 2,004,084 | Scott | June 4, 1935 |
| 2,055,763 | Greer | Sept. 29, 1936 |
| 2,109,004 | Archibald | Feb. 22, 1938 |
| 2,343,791 | O'Dell | Mar. 7, 1944 |